(12) United States Patent
Malley (10) Patent No.: US 7,854,064 B2
(45) Date of Patent: Dec. 21, 2010

(54) ENHANCED WELDABILITY FOR HIGH STRENGTH CAST AND WROUGHT NICKEL SUPERALLOYS

(75) Inventor: David R. Malley, Bolton, CT (US)

(73) Assignee: United Technologies Corporation, Hartford, CT (US)

( * ) Notice: Subject to any disclaimer, the term of this patent is extended or adjusted under 35 U.S.C. 154(b) by 1234 days.

(21) Appl. No.: 11/446,991

(22) Filed: Jun. 5, 2006

(65) Prior Publication Data
US 2007/0283560 A1 Dec. 13, 2007

(51) Int. Cl.
*B23P 6/00* (2006.01)
*C22F 1/10* (2006.01)

(52) U.S. Cl. ............... 29/889.1; 29/402.01; 29/402.04; 29/402.06; 29/402.07; 148/555; 148/556; 148/675; 148/677

(58) Field of Classification Search ............... 29/402.01, 29/402.04, 402.06, 402.07, 402.19, 402.21; 148/508, 510, 524–526, 555–556, 562, 675, 148/677
See application file for complete search history.

(56) References Cited

U.S. PATENT DOCUMENTS

| 3,386,920 | A | * | 6/1968 | Alburger | ............... 252/301.19 |
|---|---|---|---|---|---|
| 3,850,712 | A | * | 11/1974 | Broughton et al. | .......... 216/109 |
| 4,409,462 | A | | 10/1983 | Jahnke | |
| 5,509,980 | A | | 4/1996 | Leong-Chew | |
| 5,522,134 | A | * | 6/1996 | Rowe et al. | ................. 29/889.1 |
| 5,554,837 | A | | 9/1996 | Goodwater et al. | |
| 6,049,979 | A | | 4/2000 | Nolan et al. | |
| 6,120,624 | A | * | 9/2000 | Vogt et al. | ................... 148/675 |
| 6,755,924 | B2 | * | 6/2004 | Harrison et al. | ............. 148/675 |
| 7,632,363 | B2 | * | 12/2009 | Yoshioka et al. | ............ 148/677 |

FOREIGN PATENT DOCUMENTS

| EP | 0478374 | 4/1992 |
| EP | 0969114 | 1/2000 |

* cited by examiner

*Primary Examiner*—David P Bryant
*Assistant Examiner*—Alexander P Taousakis
(74) *Attorney, Agent, or Firm*—Bachman & LaPointe, P.C.

(57) ABSTRACT

A method for repairing a turbine engine component comprises the steps of providing a turbine engine component formed from a nickel-based superalloy, removing any defects from the turbine engine component, the removing step comprising subjecting the turbine engine component to a solutioning heat treatment using a heating rate in the range of from 29 degrees Fahrenheit/minute to approximately 40 degrees Fahrenheit/minute as the component passes through a temperature in the range of from 1100 degrees Fahrenheit to 1600 degrees Fahrenheit, and welding the turbine engine component to effect the repair. A deliberately slow post-solution treatment cooling rate is used to substantially prevent weld cracks.

21 Claims, 5 Drawing Sheets

ENHANCED WELDABILITY FOR HIGH STRENGTH CAST AND WROUGHT NICKEL SUPERALLOYS

BACKGROUND OF THE INVENTION (1) Field of the Invention

The present invention relates to a method for repairing turbine engine components made from a nickel-based superalloy.

(2) Prior Art

The welding of highly alloyed nickel-based materials, also known as superalloys, is difficult as judged by non-destructive inspection rejections which require that defective welds be recycled, i.e. re-welded, re-heat treated, re-inspected, etc. This situation especially applies to cast superalloys having high titanium and aluminum concentrations in addition to other elements, such as carbon and boron, which can reduce weldability.

It is known in the prior art to repair cast nickel-based superalloy gas turbine engine cases using a replacement flange and electron beam (EB) welding. The replacement flange is typically formed from a wrought nickel-based superalloy. Some electron beam welds used to join these two components together experience a controlled amount of microcracking which typically occurs in heat affected zones (HAZ) and sometimes in the weld area itself. These subsurface defects can propagate to the surface as a result of solidification shrinkage strains and/or post-weld heat treatments intended to lower or eliminate weld residual stresses. Such surface cracks are detectable by fluorescent penetrant inspection (FPI) techniques only if they are large enough. The same strains can also propagate welding-related cracks and make them detectable to radiographic inspection as either sub-surface or surface-connected cracks.

In the case of electron beam welding replacement flanges onto engine-run hardware, the post-weld heat treatment often requires a full heat treatment (solution, stabilization, and/or aging) to restore the component's mechanical properties. Cast cases can also have localized cracks weld repaired during original manufacturing or after engine operation. In this situation, a gas tungsten arc welding (GTAW) process may be selected rather than electron beam welding to reduce manufacturing expenses and repair turn time. GTAW processes, by their nature, introduce significantly more heat into the cast material in comparison to electron beam welding. This situation produces both wider welds and heat affected zones. The additional energy increases cracking frequency and size. The need for repairing turbine engine components, such as original equipment cases, prior to engine operation, results from the presence of various casting defects such as cracks, porosity, and casting dross. Engine-operated cast case repairs are usually driven by cracks which exceed operational acceptance limits. Such cracks can result from operating stresses/temperatures or may be casting defects which propagate to detectable size during engine operation and/or repair thermal cycles.

Both EB flange replacement and GTAW crack weld repairs require that the welding source demonstrate its ability to produce acceptable welds. Defects visible by fluorescent penetrant inspection (FPI) are not allowed. Defects detected by radiography are allowed according to size and frequency limits. However, destructive evaluation limits are also present. They pertain to defects which can only be detectable through metallographic evaluation. Metallographic limits allow the presence of microcracks but again limit their size and frequency.

There is a need for a method which allows repairs to be performed with less need for re-welding using electron beam welding or other welding methods (e.g. GTAW, plasma arc).

SUMMARY OF THE INVENTION

Accordingly, there is provided in accordance with the present invention a method for repairing cast nickel based gas turbine engine cases using EB welding virtually without the presence of microcracks.

In accordance with the present invention, a method for repairing a turbine engine component comprises the steps of providing a turbine engine component formed from a nickel-based superalloy, removing any defects from the turbine engine component, the removing step comprising subjecting the turbine engine component to a solutioning heat treatment using a heating rate in the range of from 29 degrees Fahrenheit per minute to approximately 40 degrees Fahrenheit per minute as the component passes through a temperature in the range of from 1100 degrees Fahrenheit to 1600 degrees Fahrenheit, and welding the turbine engine component to effect the repair.

Other details of the enhanced weldability for high strength cast and wrought nickel superalloys, as well as other objects and advantages attendant thereto, are set forth in the following detailed description and the accompanying drawings.

DETAILED DESCRIPTION OF THE PREFERRED EMBODIMENT(S)

As mentioned above, the present invention relates to a method for repairing turbine engine components formed from nickel based superalloys, such as Waspaloy, using electron beam welding, GTAW, or plasma welding.

In accordance with the present invention, prior to welding, it is important to remove any remnants of original defects from the turbine engine component to be repaired and/or any replacement part to be welded to the turbine engine component. An FPI inspection technique may be used to detect any defects in the turbine engine component and/or the replacement part(s). Preferably, FPI sensitivity is increased from "High Sensitivity" FPI chemicals to "Ultra-High Sensitivity"

FPI chemicals. Suitable ultra-high sensitivity FPI chemicals which can be used include Magnaflux ZL37 manufacturerd by Magnaflux Corp. and Turco P60H2 manufactured by Turco Products, Inc. The presence of pre-existing defects where cast nickel superalloy welds are required results in a very high probability of having cracks in the repaired component. Defects are taken as any of the casting flaws mentioned previously as well as service-induced cracking. The use of "ultra-high sensitivity" chemicals enables the detection of more flaws and thus provides greater assurance of their removal by standard blending methods prior to welding the component and/or the replacement part(s).

Optionally, one could perform (1) a short thermal cycle and/or (2) lightly chemically etch the area to be welded on the turbine engine component and/or the replacement part(s) prior to FPI inspection to help assure that remnants of the original defects are removed prior to welding.

The short thermal cycle technique may comprise the steps of increasing the temperature of the component and/or the replacement part(s) to a temperature in a range of 1475 to 1525° F. Air is an acceptable atmosphere and the heating rate is optional.

Alternatively, when distortion needs to be controlled, the component and/or the replacement part(s) may be placed in a cold oven with air as an atmosphere. The temperature of the component and/or the replacement part(s) may be increased to approximately 600 degrees Fahrenheit and held there for 30 minutes. The temperature of the component and/or replacement part(s) may then be increased to approximately 900 degrees Fahrenheit and held there for 30 minutes. The temperature of the component and/or the replacement part(s) may then be increased to approximately 1000 degrees Fahrenheit and held there for 30 minutes. The temperature of the component and/or replacement part(s) may then be held to a temperature in a first range of from 1475 to 1525 degrees Fahrenheit and held there for four hours. Thereafter, the temperature of the component and/or the replacement part(s) may be decreased to 500 degrees Fahrenheit at a rate of not faster than 100 degrees Fahrenheit every 15 minutes. The subsequent cooling rate is optional.

The light chemical etching of the area to be welded is used so that there is no smeared metal present which could affect the ability of the FPI to see cracks. Welding without removing all vestiges of the prior cracking significantly increases the probability of repair weld cracking. The light chemical etching procedure may be as follows: swab etching the routed area using a ferric chloride solution for three to five minutes keeping the routed area continuously wet; thoroughly water rinse; and high or, preferably ultrahigh, fluorescent penetrant inspect the routed area for any remaining crack(s).

Solution treatment within the broad range of 1850 to 1975 degrees Fahrenheit frequently exposes rejectable defects in areas that were acceptable prior to solution heat treatment. The apparent reason for this behavior is that existing subsurface defects propagated to the surface by the thermal strains encountered during heat treatment and thus enabled detection by FPI. Another possibility is that additional strains were created by the solid state precipitation (aging) reactions that occur in nickel based superalloys, such as Waspaloy, during exposure to intermediate temperatures within the broadly defined region of 1100 to 1600 degrees Fahrenheit. These precipitation reactions cause crystallographic changes in the alloy resulting in a smaller lattice parameter after heat treatment. These shrinkage strains can also cause cracking as the component is heated to the pre-weld solution temperature. This cracking mechanism is known as strain-age or post-weld heat treatment cracking.

Further, in accordance with the present invention, the solution treatment thermal cycle for the nickel based superalloy components and/or replacement parts to be welded whether they are cast and/or wrought is modified to one where a rapid heating rate in the range of 29 degrees Fahrenheit per minute to approximately 40 degrees Fahrenheit per minute is used so that the component is within the precipitation temperature range of from 1100 degrees Fahrenheit to 1600 degrees Fahrenheit for as short a time as possible to minimize the opportunity for strain age cracking to occur. Ideally, the component(s) and the replacement part(s) should not be within the 1100 to 1600 degree Fahrenheit temperature range, for more than 17 minutes, preferably less than 13 minutes. After the component and/or replacement part(s) has reached the desired solution temperature, it is held at temperature for about 3.0 to 5.0 hours, and then cooled in air. The point of the aforementioned modification to the solution heat treating process is to minimize the time available for the aging strains to develop (which would facilitate cracking prior to welding). Prior art processes did not control the heating rate within this temperature range. It should be noted that once the component and/or replacement part(s) is/are solution treated, the residual stresses essentially have been reduced to at/near zero. Consequently, there is no risk of strain-age cracking occurring during cooling from the solution treatment temperature.

Solution heat treatment is known to improve weldability by dissolving the γ' particles which leads to an increase in ductility and a corresponding decrease in strength. Increasing a nickel based superalloy's high temperature ductility allows it to accommodate welding and other imposed strains without cracking. The prior art solution heat treatment of cast nickel based superalloys required cooling at a rate equivalent to air cooling, typically 30 to 40 degrees Fahrenheit/minute. However, employing a slower cooling rate from the solution treatment temperature range to below 1250 degrees Fahrenheit is much more effective in enhancing weldability. In accordance with the present invention, a cooling rate of from 0.5 to 10 degrees Fahrenheit/minute is used. Preferably, the cooling rate is from 0.5 to 1.0 degrees Fahrenheit/minute. This allows a significant time for γ' precipitation to occur during cooling which also allows the γ' particle sizes to grow significantly which reduces their hardening capability, thus increasing high temperature ductility.

Figure 1A:
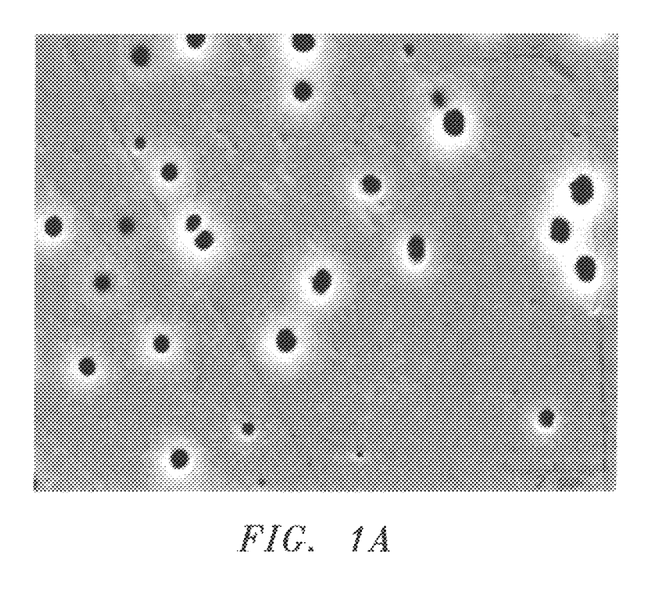
FIG. 1A is a photomicrograph showing a wrought version of a Waspaloy sample subjected to a conventional solution heat treatment followed by a conventional 30-4020 F./minute cooling rate.
Figure 1B:
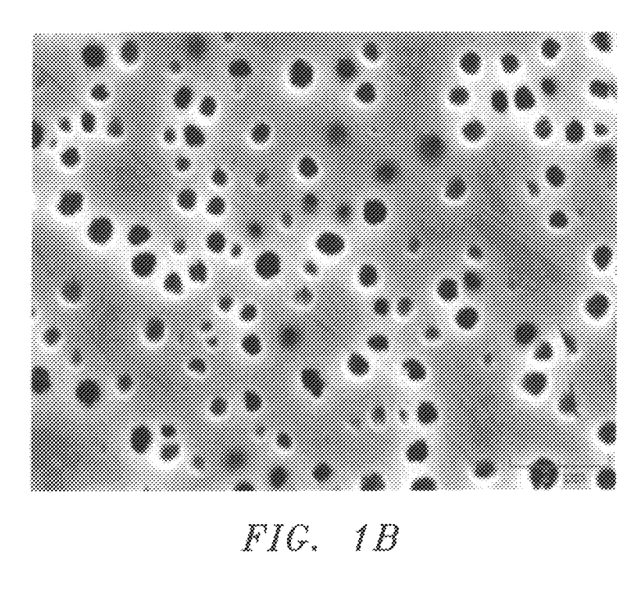
FIG. 1B is a photomicrograph of a wrought version of a Waspaloy sample subjected to a conventional solution heat treatment and then slow cooled at a rate of 1 degree Fahrenheit/minute to below 1250° F.
Figure 2A:
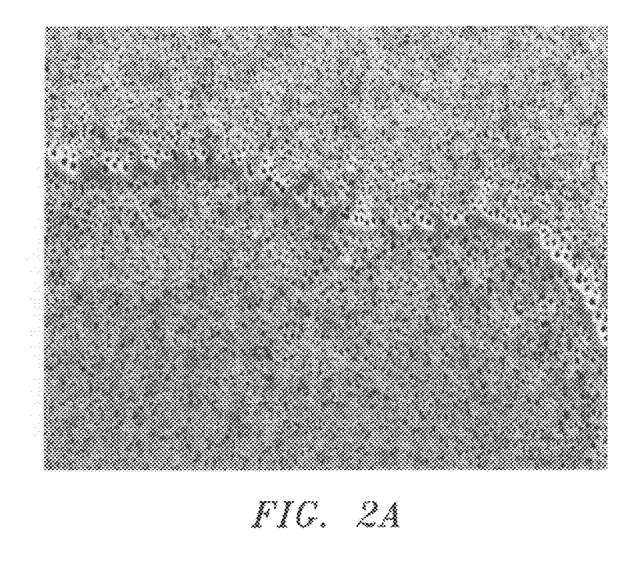
FIG. 2A is a photomicrograph showing a cast version of a Waspaloy sample.
Figure 2B:
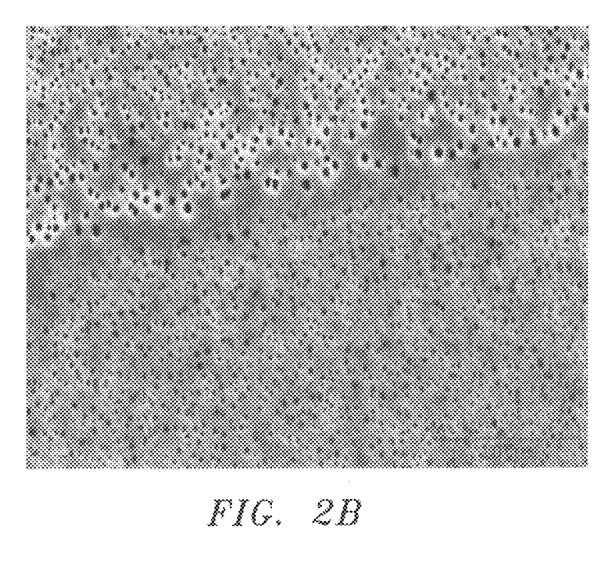
FIG. 2B is a photomicrograph showing a cast version of a Waspaloy sample after slow cooling.
Figure 3A:
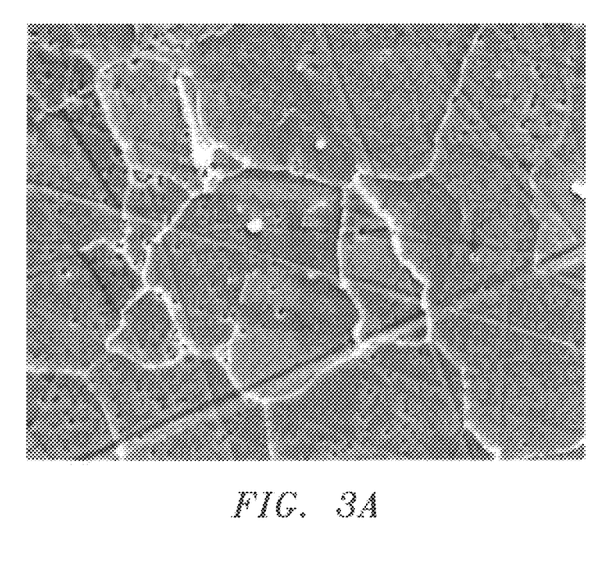
FIG. 3A is a photomicrograph showing a wrought version of a Waspaloy sample.
Figure 3B:
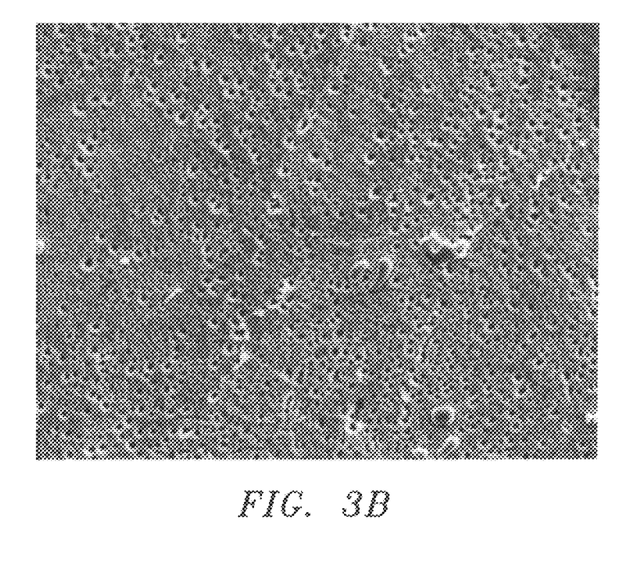
FIG. 3B is a photomicrograph of a wrought version of a Waspaloy sample after slow cooling.
Figure 4A:
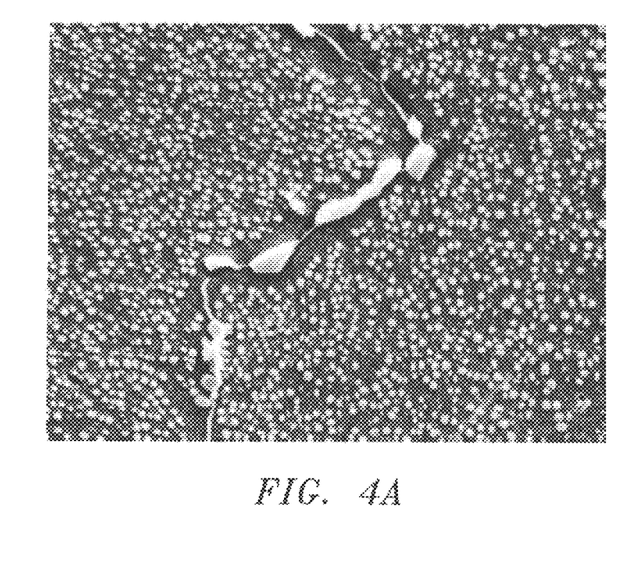
FIG. 4A is a photomicrograph showing a cast version of a Waspaloy sample.
Figure 4B:
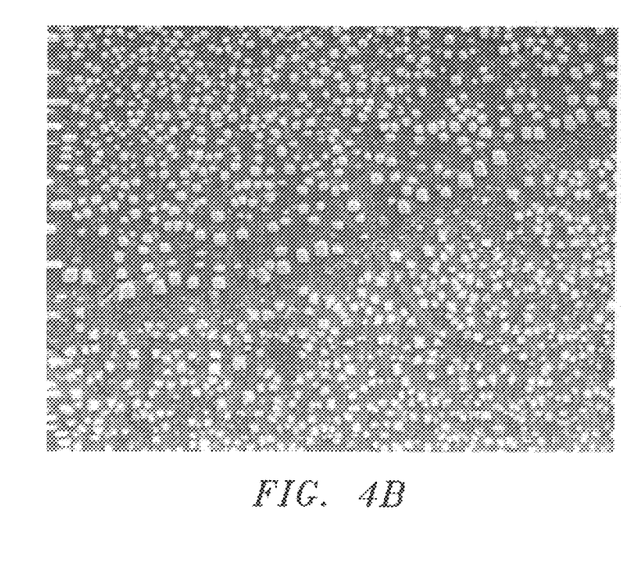
FIG. 4B is a photomicrograph showing a cast version of a Waspaloy sample after slow cooling.

As shown in FIGS. 1A, 1B, 2A and 2B, scanning electron microscopy (SEM) confirms that the γ' size in both cast and wrought forms of a nickel based superalloy such as Waspaloy is significantly larger than with a conventional full heat treatment. In FIG. 1A, there was 2% of submicron sized γ' particles. In FIG. 1B, there was 14% of submicron sized γ' particles. The dark particles are the γ' phase that is present in a γ matrix. Both photomicrographs were etched with AG-21 reagent and have an original magnification of approximately 2000×. In FIGS. 2A and 2B, the volume of submicron sized γ' particles appeared essentially unchanged after slow cooling; however the submicron sized cooling γ' increased from 0.3 microns to 0.4 to 0.5 microns. Both photomicrographs were etched with AG-21 reagent and have an original magnification of approximately 2,000×. Importantly, it also shows that the amount of grain boundary carbide precipitation, typically $M_{23}C_6$ carbides where M is a metal atom, probably chromium, is nearly eliminated by the slow cool treatment. See FIGS. 3A, 3B, 4A and 4B. This significantly increases grain boundary ductility which is where HAZ microcracking typically occurs. In FIGS. 3A and 3B, both photomicrographs were etched with Kallings reagent and have an original magnification of approximately 2000×. In FIGS. 4A and 4B, both photomicrographs were etched with Aqua Regia reagent. FIG. 4A has an original magnification of approximately 10000×. FIG. 4B has an original magnification of approximately 4000×.

When performing welding, a weld wire may be used to weld the cast turbine engine component to the replacement part(s) or may be used to effect the repair to the turbine engine component. The GTAW process virtually always involves the use of a weld wire. EB welding optionally uses weld wire depending on the features that require welding. The cast version of some nickel based superalloys, such as Waspaloy, has important compositional differences relative to the wrought form of the same alloy in order to improve the casting's weldability using the prior art standard process. The present invention preferably uses a weld wire, when one is required, having essentially the same composition as the cast nickel based superalloy rather than using a conventional weld wire composition. One weld wire composition which may be used contains from 18 to 21 wt % chromium, from 12 to 15 wt % cobalt, from 3.5 to 5.0 wt % molybdenum, from 2.75 to 3.5 wt % titanium, from 1.2 to 1.6 wt % aluminum, from 0.003 to 0.01 wt % boron, from 0.02 to 0.1 wt % carbon, and the balance nickel. The weld wire preferably has a small diameter. During welding, a minimum heat input is used which is consistent with obtaining adequate penetration.

Still another aspect of the present invention is a modified post-weld heat treatment which is applied to the welded component to eliminate the microstructural features generated by the pre-weld solution treatment's slow cooling rate and restore specification mechanical properties. This modification involves using the same rapid heating rate as that of the pre-weld solution treatment for the same reasons.

Following the post-weld heat treatment, the repaired component may be inspected using high sensitivity or ultra-high sensitivity fluorescent penetrant inspection and radiographic inspection. Optionally, these inspections can be performed prior to welding. Other techniques, such as visual, eddy current, or ultrasonic inspection, can also be used if deemed necessary for specific applications.

As mentioned, using electron beam welding for flange replacement repairs for cast nickel based superalloy cases were not allowed prior to the present invention because of cracking issues. Using the method of the present invention enables electron beam welding of replacement flanges to cast nickel based superalloy cases and it produces superior welds. To illustrate the point, microcracks that were routinely found in wrought-to-wrought Waspaloy component welds were not present in the cast Waspaloy cases as a direct result of the present invention.

Prior art flange replacement repairs for less highly alloyed cast superalloy cases required the case component to be cleaned, FPI and radiographed, solution heat treated to obtain some weldability improvement, EB welded, fully heat treated (solution, stabilization and aging) and final FPI/radiographic inspection.

Using the method of the present invention, complete removal of any existing cracks or wear as evidenced by ultra-high sensitivity FPI and radiographic inspection is important to assuring enhanced weldability. The use of a nickel based superalloy weld wire is typically not used in EB Welding for flange replacement. However, such weld wire can be used from a technical perspective and so is not excluded by this invention. Further, the repair of worn and/or cracked sealing features on wrought superalloy rotating components, frequently called knife edges or seal fins, does require the use of a weld wire. In the present invention, the ultra high sensitivity FPI method and radiographic inspection are used for EB welding of cast and/or wrought nickel based superalloy components as is the same slow cooling rate employed after the pre-weld solution treatment. The need for rapid heating rates to the pre- and post-weld solution temperature is also applied in EB welding. The present invention lends itself to enable the attachment of wrought nickel based superalloy flanges to cast nickel based superalloy cases. One or more flange replacements can be so performed to allow restoring the component to its desired flight worthy condition. The slow cooling rate may be successfully applied to both cast and wrought case components. However, it is possible to effect welding even though only the cast component is slowly cooled.

Various other cast nickel based superalloy components such as tangential on-board injection ducts could be GTAW weld repaired using the present invention. Based on the ability to successfully replace wrought flanges using the present invention, wrought nickel based superalloy cases, such as low pressure turbine cases, may also benefit from the present invention where either GTAW welding is required to repair cracks and/or wear or EB welding is used to replace flange(s) and/or case mid-sections as well as repairing bolthole cracks. Current EB and GTAW processes applied to wrought Waspaloy components do not use the solution treatment process because of distortion concerns. Consequently, weldability is not as robust as it would be if all of the steps in the present invention were applied. In which case, the current large amount of re-welding and other process iterations would be reduced significantly based on the greater weldability of the wrought material. The use of differential thermal expansion tooling would help to control dimensions during solution heat treatment of distortion-prone wrought superalloy cases.

As with the GTAW process, EB welds should be produced using welding parameters (e.g. beam current, focus current, beam oscillation parameters, etc.) which impart minimum heat to the component while still achieving required penetration and avoiding weld undercut and other injurious effects.

The present invention may also work with plasma welding, both transferred-arc and non-transferred arc processes.

The method of the present invention may be used with a wide variety of cast and wrought nickel based alloys including Waspaloy, IN-738, IN-792, IN-939 and others.

Figure 5:
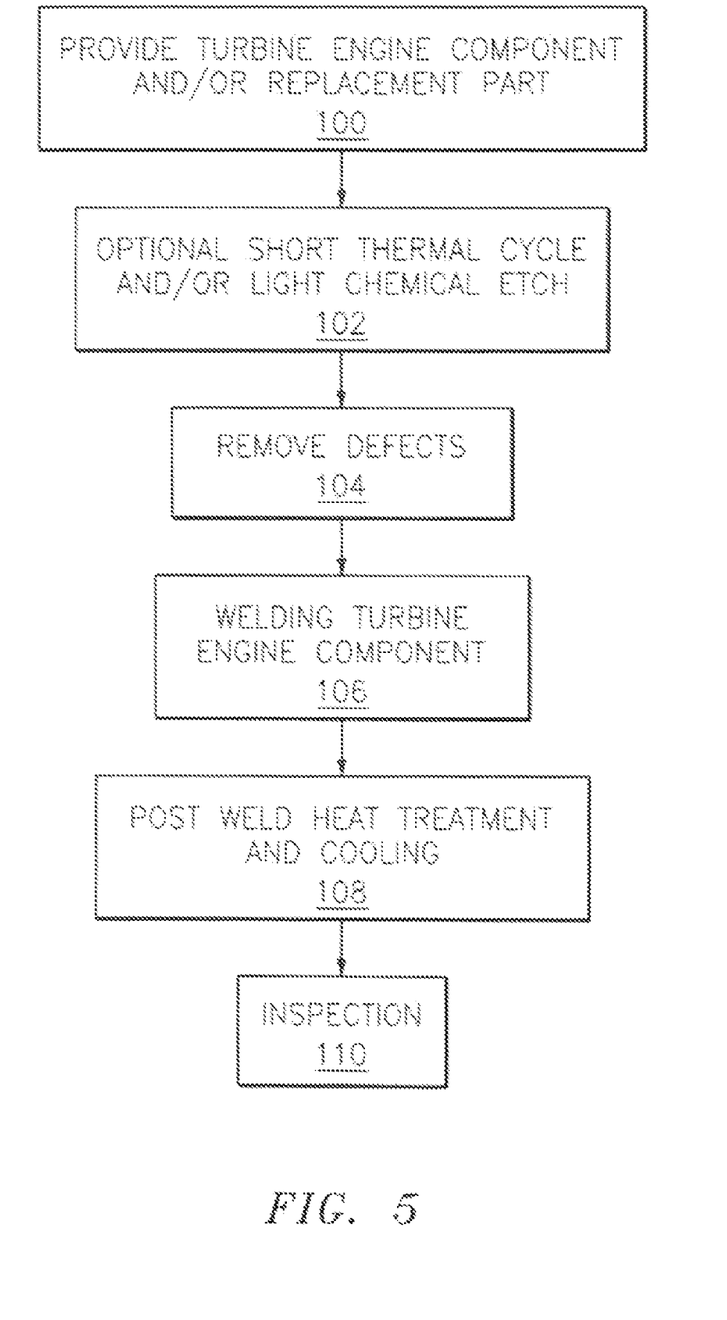
FIG. 5 is a flowchart showing the steps of the turbine engine repair method of the present invention.

Referring now to FIG. 5, the repair method of the present invention which has been described above is shown in schematic form. In step 100, a turbine engine component to be repaired is provided. Also, a replacement part may be provided. In step 102, an optional short thermal cycle and/or light chemical etching step may be performed to help assure that remnants of the original defects are removed from the turbine engine component and/or a replacement part prior to welding. In step 104, the turbine engine component and/or the replacement part is inspected for defects. In step 104, the defects which have been detected are removed from the turbine engine component and/or the replacement part. As set forth hereinabove, a solution heat treatment is utilized to remove the defects. Further as part of step 104, the turbine engine component and/or replacement part is cooled. After the cooling has been completed, as shown in step 106, the replacement part or a weld wire is welded to the turbine engine component being repaired. Following the welding step, as shown in step 108, the welded turbine engine component is subjected to a post weld heat treatment and cooling step.

Following the post weld heat treatment and cooling step, the repaired turbine engine component may be inspected as shown in step 110.

It is apparent that there has been provided in accordance with the present invention an enhanced weldability for high strength cast and wrought nickel superalloys which fully satisfies the objects, means, and advantages set forth hereinbefore. While the present invention has been described in the context of specific embodiments thereof, other unforeseeable alternatives, modifications, and variations may become apparent to those skilled in the art having read the foregoing detailed description. Accordingly, it is intended to embrace those alternatives, modifications, and variations as fall within the broad scope of the appended claims.

What is claimed is:

1. A method for repairing a turbine engine component comprising the steps of:
   providing a turbine engine component formed from a nickel-based superalloy;
   removing any defects from said turbine engine component;
   said removing step comprising subjecting said turbine engine component to a solutioning heat treatment using a heating rate in the range of from 29 degrees Fahrenheit/minute to approximately 40 degrees Fahrenheit/minute as the component passes through a temperature in the range of from 1100 degrees Fahrenheit to 1600 degrees Fahrenheit; and
   welding said turbine engine component to effect said repair,
   wherein said solutioning step comprises maintaining said turbine engine component at a temperature in the range of from 1100 to 1600 degrees Fahrenheit for a time period not greater than 17 minutes.

2. The method according to claim 1, wherein said turbine engine component providing step comprises providing a cast turbine engine component formed from said nickel-based superalloy.

3. The method according to claim 1, wherein said turbine engine component providing step comprising providing a wrought turbine engine component formed from said nickel-based superalloy.

4. The method according to claim 1, wherein said defect removing step further comprises inspecting said turbine engine component using a fluorescent penetrant inspection technique prior to said solutioning heat treatment.

5. The method according to claim 4, wherein said inspecting step comprises inspecting said turbine engine component using an ultra high sensitivity penetrant fluid.

6. The method according to claim 4, further comprising subjecting said turbine engine component to a short thermal cycle prior to said inspecting step.

7. The method according to claim 4, further comprising lightly etching said turbine engine component prior to said inspecting step.

8. The method according to claim 1, further comprising cooling said turbine engine component from a maximum heat solution heat treatment temperature to a temperature below 1250 degrees Fahrenheit at a cooling rate of from 0.5 to 10 degrees Fahrenheit/minute.

9. The method according to claim 8, wherein said cooling step comprises cooling said turbine engine component from said maximum solution heat treatment temperature at a cooling rate of from 0.5 to 1.0 degrees Fahrenheit/minute.

10. The method according to claim 1, wherein said welding step comprises electron beam welding said turbine engine component to effect said repair.

11. The method according to claim 1, wherein said welding step comprises GTAW welding said turbine engine component to effect said repair.

12. The method according to claim 1 wherein said welding step comprises plasma arc welding said turbine engine component to effect said repair.

13. The method according to claim 1, wherein said welding step comprises welding a wrought replacement part to said turbine engine component.

14. The method according to claim 1, wherein said turbine engine component providing step comprises providing a cast engine case and said welding step comprises welding at least one wrought replacement flange to said cast engine case.

15. The method according to claim 1, wherein said welding step comprises effecting said welding using a welding wire formed from a material having a composition substantially similar to a composition of said turbine engine component.

16. The method according to claim 2, wherein said welding step comprises effecting said welding using a welding wire with a composition chosen to match the composition of said cast turbine engine component.

17. The method according to claim 1, further comprising subjecting said welded turbine engine component to a post weld heat treatment.

18. A method for repairing a turbine engine component comprising the steps of:
   providing a turbine engine component formed from a nickel-based superalloy;
   removing any defects from said turbine engine component;
   said removing step comprising subjecting said turbine engine component to a solutioning heat treatment using a heating rate in the range of from 29 degrees Fahrenheit/minute to approximately 40 degrees Fahrenheit/minute as the component passes through a temperature in the range of from 1100 degrees Fahrenheit to 1600 degrees Fahrenheit; and
   welding said turbine engine component to effect said repair,
   wherein said solutioning step comprises maintaining said turbine engine component at a temperature in the range of from 1100 to 1600 degrees Fahrenheit for a time period not greater than 13 minutes.

19. A method for repairing a turbine engine component comprising the steps of:
   providing a turbine engine component formed from a nickel-based superalloy;
   removing any defects from said turbine engine component;
   said removing step comprising subjecting said turbine engine component to a solutioning heat treatment using a heating rate in the range of from 29 degrees Fahrenheit/minute to approximately 40 degrees Fahrenheit/minute as the component passes through a temperature in the range of from 1100 degrees Fahrenheit to 1600 degrees Fahrenheit;
   welding said turbine engine component to effect said repair; and
   subjecting said welded turbine engine component to a post weld heat treatment,
   wherein said post weld heat treatment subjecting step comprises subjecting said welded turbine engine component to a post weld heat treatment using a rapid heating rate in the range of from 29 degrees Fahrenheit/minute to approximately 40 degrees Fahrenheit/minute as said welded turbine engine component is in a temperature range of from 1100 to 1600 degrees Fahrenheit.

20. The method according to claim 19, further comprising cooling said welded turbine engine component from a maximum solution heat treatment temperature to a temperature below 1250 degrees Fahrenheit at a cooling rate of from 0.5 to 10 degrees Fahrenheit/minute.

21. The method according to claim 19, wherein said cooling step comprises cooling said welded turbine engine component from said maximum heat solution heat treatment temperature at a cooling rate of from 0.5 to 1.0 degrees Fahrenheit/minute.

* * * * *